United States Patent Office

3,812,049
Patented May 21, 1974

3,812,049
PRECIPITATION DELAYING PROCESS EMPLOYING A SYNERGISTIC MIXTURE OF COMPLEXING AGENTS
Arend Jaman Noothout, Oosterbeek, Johannes Bastiaan Willem Kanij, Zevenaar, and Otakar Votocek, Arnhem, Netherlands, assignors to Reactor Centrum Nederland, The Hague, Netherlands
No Drawing. Filed Apr. 28, 1971, Ser. No. 138,285
Claims priority, application Netherlands, Apr. 29, 1970, 7006258
Int. Cl. C01g 43/02
U.S. Cl. 252—301.1 S                          6 Claims

ABSTRACT OF THE DISCLOSURE

An improvement of a method is disclosed for the preparation of particles of so-called sol-gel material. The improvement consists of avoiding premature precipitation of mixtures of metal salt solutions and ammonia liberating agents by employing a complex forming substance which consists of urea in combination with salicylic acid, substituted salicylic acid, amino sulphonic acid, ethylene glycol, or glycolic acid.

The particles of the sol-gel material produced can be converted by thermal treatment into ceramic nuclear fuel particles.

---

The invention relates to a method of making shaped objects, more particularly grains, starting with aqueous metal salt solutions. By metal salt solutions is meant here solutions of metal salts or kindred liquids, whilst metal hydroxide sols may also be used.

The objects to be made are composed of metal oxide hydrate and of metal oxide hydrate-ammoniacate, the said two substances being mixed with carbon, metal oxide, metal carbide or metal carbonitride.

Known per se are methods for making grains, starting with aqueous solutions of metal salts, to which an excess of one or more ammonia-liberating agents is added.

According to these methods the mixture of salt solution and ammonia-liberating agent, with an optional addition of finely divided carbon, is solidified by treatment at a high temperature. Special embodiments are employed in the manufacture of grains of very diverse diameters which can be used in fissile elements of nuclear reactors.

The known methods show the drawback that in order to effect the desired rapid solidification at higher temperatures a large amount of ammonia-liberating agent has to be used, especially if large diameters are required.

Premature precipitation then occurs within such a short time after mixing that the processing of the solution is rendered very difficult.

A known way of obviating this difficulty is by cooling the salt solution mixed with ammonia-liberating agent, which in certain cases is found to be a drawback.

Another possibility is to use less ammonia-liberating agent; in that case, however, additional measures have to be taken such as the use of dehydrating liquids, along with liberation of the ammonia. The dehydrating liquids used are higher alcohols.

It is also possible to dissolve ammonia in the dehydrating liquid. This gives rise to difficulties in maintaining the level of the ammonia concentration and in removing the water absorbed.

The invention aims at avoiding the above-mentioned drawbacks.

According to the invention the metal salt solution is protected against premature precipitation by adding to it, along with the ammonia-liberating agent, one or more substances which react with the metal ions to form complex compounds. This protective action has not yet been used in conjunction with an ammonia-liberating agent.

The complex-forming substances and the complexes formed must have a sufficiently high solubility in the metal salt solution and yet not be soluble in the organic liquid to be used. Moreover, the stability of the complex and existing concentration of complex former must be such, or be so selected, that the desired rapid solidification at a high temperature does in fact occur.

The decomposition of the complex may be effected according to the undermentioned mechanisms:

(a) thermal decomposition of the complex as a whole;
(b) thermal instability of the complexing ligand;
(c) exchange of the ligands of ions, such as OH' ions, which promote precipitation of the metal ion;
(d) reaction of the ligand with another substance, causing the ligand to be withdrawn from the complex.

Examples of suitable complex formers are: water-soluble alkyl derivatives of urea, salicylic acid, aminosulphonic acid and mixtures of these substances with each other.

According to a known method high-molecular substances are added as gel formers to a uranyl nitrate solution. Some of these substances can bind the uranium as a complex.

In that case, however, the forming of the complex does not serve to protect the uranium against premature precipitation but to promote fine dividing of the uranium in the high-molecular gel.

According to this method the mixed solution is dripped into a strongly alkaline liquid, as a result of which the high-molecular component gels and the precipitate of uranium that is formed at the same time is enclosed in a finely divided form.

The use of urea along with an ammonia-liberating agent such as hexamethylene-tetramine, hereinafter called hexa, is known per se, but in this application the urea was formerly regarded as an ammonia-liberating agent.

Under the conditions in which the method according to the invention is preferably carried out, the amount of ammonia which forms from urea is negligible as compared with the amount of ammonia that is produced from hexamethylene-tetramine.

It has been observed elsewhere that urea accelerates the decomposition of hexamethylene-tetramine. It is found, however, that urea lowers the speed of precipitation of, say, uranium VI, under otherwise identical conditions. This again indicates that the cause of the protection lies in a reaction between uranium and urea in which a complex is formed.

The method according to the invention considerably enlarges the possibility of guarding against premature solidification.

It has also been found as a surprise that the prevention afforded by urea against premature precipitation can be greatly increased, and in fact synergistically, by the addition of comparatively small amounts of other complex formers.

These complex formers may in fact be so highly complexing that they protect a corresponding part of the uranium against precipitation, under the conditions to be employed, and the uranium thus remains in solution inside the solidified drop. In the subsequent alkaline washing the uranium is completely precipitated.

Examples of these combinations are: urea and/or alkyl derivatives of urea with one or more compounds respectively, such as aminosulphonic acid, salicylic acid or 5-sulphosalicylic acid, 3,5-dinitrosalicylic acid, ethyleneglycol and glycolic acid.

By "synergistic action" is meant here a larger measure of protection against premature precipitation by the combined complex formers than can be expected on the basis of the protection afforded by the concentrations of the individual components.

Although not restricted to this, the invention is particularly suited for producing grains of fissile material for use in the fissile elements of nuclear reactors.

As initial material for this purpose use is made of concentrated solutions of uranyl nitrate which, if desired, are rendered anion-deficient. In addition, salts of plutonium or thorium are added, whilst the addition of salts of the elements zirconium, hafnium or of lanthanides is likewise possible.

In some cases it may be advantageous to promote solidification of the metal salt solution, mixed with ammonia-liberating agent, by treatment with a liquid containing free ammonia, ammonia-liberating agent or mixtures of these substances.

The following metal salt solutions are suitable, in the fullest sense, for this purpose: normal metal salt solutions, anion-deficient metal salt solutions, metal hydroxide sols or mixtures of these liquids with each other.

Serviceable, highly concentrated solutions of lanthanide salts and/or actinide salts are obtained by complexing aqueous solutions of these salts at an elevated temperature with a complex former for the metal ion, for instance urea in the case of uranyl salts, and then cooling them.

The maximum temperature for this purpose may be approximately the boiling point of the salt solution.

If the intention is to prepare carbonaceous fissile materials from these solutions, finely divided carbon is added prior to the precipitation stage.

Another possibility is to prepare grains that are serviceable for nuclear reactors, taking as starting material a thorium solution containing quantities of other metal components selected from the group of plutonium, uranium, hafnium, zirconium, or rare-earths.

It is observed that both the thorium solution and the added metal component may be either a salt solution, an anion-deficient salt, a metal hydroxide sol or a mixture of these substances.

In the case of replacement of the uranyl ion by the thorium ion, other complex formers might possibly be used.

Example I shows the protection afforded against premature precipitation of mixtures of anion-deficient uranyl nitrate solution and hexa by making use of a substnace that forms a complex with uranium.

Examples II, III and IV relate to the preparation of spheres in which the complex former used is respectively urea, aminosulphonic acid, hereinafter called ASA, and 5-sulphosalicylic acid, hereinafter called SSA.

Example V relates to the synergistic affect upon the protection obtained by using mixtures of urea together with another complex former.

EXAMPLE I

The keeping capacities of solutions of different compositions can be compared with each other by determining the so-called keeping time.

The solutions of uranyl nitrate, to which one or more complex formers are added, and the solution of hexamethylenetetramine, are separately cooled down to $-4°$ C. The cooled solutions are at a certain moment quickly mixed, thereby causing the temperature to rise. Immediately after mixing, the mixed solution is again cooled to $-4°$ C. When this temperature is reached, the solution is exposed to room temperature. The moment is recorded at which a cloudiness occurs in the liquid. The time elapsing between this moment and the moment of mixing, the "keeping time," is a measure for the keeping capacity of the solution, which can be used for comparing liquids of different compositions.

A number of experiments are summarized below in Table A. In each case 10 ml. of 3 molal of uranyl nitrate ($NO_3'/U=1.5$) is brought together with a quantity of complex former dissolved therein, in such a manner that the concentration stated in the table is reached. These solutions are in each case mixed with 14 ml. of 3 molal hexamethylene-tetramine solution.

TABLE A

| Complex former | Concentration, mol. wt. | Keeping time, min. |
| --- | --- | --- |
| None | | ½ |
| Urea | 3 | 14 |
| Aminosulphonic acid | 0.4 | 5 |
|  | 1.3 | 20 |
| Salicylic acid | 0.036 | 22 |
| 5-sulphosalicylic acid | 0.08 | 5 |
|  | 0.16 | 12 |
|  | 0.24 | 20 |
|  | 0.32 | 63 |
| Ethyleneglycol | a1 | 6 |
|  | a2 | 12 |
|  | a3 | 24 | a Milliliters.

EXAMPLE II

A 3 molal anion-deficient uranyl nitrate solution, $NO_3'/U$ ratio 1.5, is mixed with a solution which is 3 molal both in hexa and in urea. The ratio of the volumes of the uranyl nitrate solution and the solution of ammonia-liberating agent is 0.7. The mixed solution is subsequently dispersed in a hot organic liquid consisting of a perchlorethylene-paraffinum liquidum mixture having a density of 1.3 g./m.$^3$ (90° C.).

The spheres solidify and are separated from the organic liquid. After being rinsed with carbon tetrachloride (to remove remnants of organic liquid), the spheres are washed with dilute ammonia solution.

The washed-out yellow spheres are dried by exposure to air (70–80° C.), after which they are reduced and sintered in an oxygen-free 20% $H_2$/80% $N_2$ mixture.

EXAMPLE III

A 3 molal anion-deficient uranyl nitrate solution, $NO_3'/U$ ratio 1.5, having a 1 molal ASA concentration, is mixed with a 3 molal hexa solution. The ratio of the volumes of the hexa solution to the complexed uranyl nitrate solution is in this case 1.4. The liquid obtained is then dispersed in a hot organic liquid (temperature 90° C.), consisting of a perchlorethylene-paraffinum liquidum mixture having a density of 1.3 g./cm.$^3$ (90° C.).

After a detention time of 15 minutes the solidified spheres are successively separated, rinsed with $CCl_4$, washed out with 1:20 dilute ammonia solution and aceton and are finally sintered into uranium oxide spheres.

EXAMPLE IV

The anion-deficient uranyl nitrate solution was complexed in this example with SSA, concentration 0.2 mol./litre.

The further conditions were identical with those stated in Example III.

EXAMPLE V

In this example the keeping capacity of mixtures containing urea as a complex former is compared with that of mixtures in which, along with urea, another complex former is dissolved. In order to ascertain the "keeping time" the procedure described in Example II was followed, subject to the condition that the uranyl nitrate solution having the other complex former in the stated concentration is mixed with a solution which is 3 molal both in urea and in hexamethylene-tetramine.

Below, in Table B, experiments are recorded in which the solutions, after having been mixed and cooled down to $-4°$ C., were kept at room temperature.

In Table C a record is given of experiments in which the solutions, after having been mixed and cooled down to $-4°$ C., are kept at $+10°$ C.

The synergistic effect of the complex formers added along with urea is clearly evident from the two tables.

TABLE B

| Complex former | Concentration, Mol. wt. | Keeping time at room temp. in minutes |
|---|---|---|
| Urea | 3 | 14 |
| Salicylic acid | 0.036 | 22 |
| Urea plus salicylic acid | a 3+0.036 | 38 |
| Urea | 3 | 14 |
| Sulphosalicylic acid | 0.08 | 5 |
| Urea plus sulphosalicylic acid | a 3+0.08 | 26 |
| Urea | 3 | 14 |
| Aminosulphonic acid | 0.1 | ½ |
| Urea plus aminosulphonic acid | a 3+0.1 | 17 |
| Urea | 3 | 14 |
| Aminosulphonic acid | 0.2 | 1 |
| Urea plus aminosulphonic acid | a 3+0.2 | 25 | a The first value relates to the concentration of the urea and the second to the concentration of the extra addition of the complex former.

TABLE C

| Complex former | Concentration, mol. wt. | Keeping time at 10° C. in minutes |
|---|---|---|
| Urea | 3 | 11.5 |
| Sulphosalicylic acid | 0.08 | 3 |
| Urea plus sulphosalicylic acid | a 3+0.08 | 51 |
| Urea | 3 | 10 |
| Aminosulphonic acid | 0.2 | 1 |
| Urea plus aminosulphonic acid | a 3+0.2 | 21 | a The first value relates to the concentration of the urea and the second to the concentration of the extra addition of the complex former.

We claim:

1. In a method for the preparation of grains comprising the steps of:
   (a) adding to an aqueous metal salt solution selected from the group consisting of the soluble salts of uranium, plutonium, thorium, hafnium, zirconium, yttrium and the rare earths at least one ammonia-liberating compound which, upon heating, liberates ammonia;
   (b) heating the solution of step (a) to cause it to solidify;
   (c) separating and washing the thus-solidified grains; and
   (d) drying and thermally treating the separated grains, the improvement comprising adding to said aqueous metal salt solution of step (a), prior to heating, urea or an alkyl-substituted urea in combination with at least one complex forming compound, said compound selected from the group consisting of salicylic acid, substituted salicylic acid, aminosulphonic acid, ethylene glycol and glycolic acid, wherein in said urea and complex forming compound in combination delay precipitation of said metal salt from the solution of step (a).

2. A method according to claim 1 wherein said complex forming compound is selected from the group consisting of salicylic acid, 5-sulphosalicylic acid, 3,5-nitrosalicylic acid, amino sulphonic acid, ethylene glycol and glycolic acid.

3. A method according to claim 1 wherin said aqueous metal oxide solution an anion-deficient metal salt solution, a metal hydroxide sol or mixtures thereof with said salt solution.

4. A method according to claim 1 wherein said ammonia-liberating compound is hexamethylene tetramine.

5. A method according to claim 1 wherein said aqueous metal salt solution is a saturated solution of uranyl nitrate.

6. A method according to claim 1 wherein said ammonia-liberating agent and said metal salt solution when mixed together are solidified by a member selected from the group consisting of a liquid containing free ammonia, an additional ammonia liberating agent and their mixture.

References Cited

UNITED STATES PATENTS

| 3,669,632 | 6/1972 | Kanij et al. | 23—345 |
| 3,397,257 | 8/1968 | Brambilla et al. | 264—0.5 |
| 3,535,264 | 10/1970 | Hackstein et al. | 252—301.1 |
| 3,401,122 | 9/1968 | Cogliati et al. | 252—301.1 |
| 3,384,687 | 5/1968 | Flack | 264—0.5 |
| 3,312,631 | 4/1967 | Smith | 252—301.1 |
| 3,312,632 | 4/1967 | Smith | 252—301.1 |
| 3,235,326 | 2/1966 | Slooten | 252—301.1 |
| 2,896,930 | 7/1959 | Menke | 23—321 X |

FOREIGN PATENTS

| 1,169,210 | 10/1969 | Great Britain | 252—301.1 |
| 904,679 | 8/1962 | Great Britain | 252—301.1 |

CARL D. QUARFORTH, Primary Examiner

R. L. TATE, Assistant Examiner

U.S. Cl. X.R.

252—317; 264—0.5; 423—251, 252, 261